(12) United States Patent
Lawrence et al.

(10) Patent No.: US 12,244,143 B2
(45) Date of Patent: Mar. 4, 2025

(54) METHODS OF SECURELY CONTROLLING UTILITY GRID EDGE DEVICES

(71) Applicants: DUKE ENERGY CORPORATION, Charlotte, NC (US); OPEN ENERGY SOLUTIONS INC., Santa Clara, CA (US)

(72) Inventors: David Crawford Lawrence, Charlotte, NC (US); Marshal Dwayne Bradley, Gastonia, NC (US); Thomas E. Burdick, Chicago, IL (US); Jessica C. Modeen, Charlotte, NC (US); Nicholas J. Kennedy, Jasper, AL (US); Matthew A. DeVenny, Phoenix, AZ (US); Caleb J. Lloyd, Raleigh, NC (US); C. Wilson Kinard, Greenville, SC (US)

(73) Assignees: DUKE ENERGY CORPORATION, Charlotte, NC (US); OPEN ENERGY SOLUTIONS INC., Santa Clara, CA (US)

( * ) Notice: Subject to any disclaimer, the term of this patent is extended or adjusted under 35 U.S.C. 154(b) by 198 days.

(21) Appl. No.: 17/583,384

(22) Filed: Jan. 25, 2022

(65) Prior Publication Data
US 2022/0337082 A1    Oct. 20, 2022

Related U.S. Application Data

(60) Provisional application No. 63/174,704, filed on Apr. 14, 2021.

(51) Int. Cl.
*H02J 13/00* (2006.01)
*G06F 21/72* (2013.01)

(52) U.S. Cl.
CPC ........ *H02J 13/00016* (2020.01); *G06F 21/72* (2013.01); *H02J 13/00022* (2020.01)

(58) Field of Classification Search
CPC .............. G06F 21/72; H02J 13/00016; H02J 13/00022; Y04S 40/20; H04L 9/3263
See application file for complete search history.

(56) References Cited

U.S. PATENT DOCUMENTS

| | | | |
|---|---|---|---|
| 5,689,565 A * | 11/1997 | Spies ..................... | G06F 21/602 713/176 |
| 9,722,665 B2 | 8/2017 | Smith et al. | |
| 10,523,597 B2 * | 12/2019 | Giorgi ................ | H04Q 11/0062 |
| 11,115,224 B1 * | 9/2021 | Scofield ................ | H04L 9/0825 |
| 2005/0111560 A1 * | 5/2005 | Haines ..................... | H04B 3/56 375/257 |
| 2008/0059799 A1 * | 3/2008 | Scarlata ................ | H04L 9/0897 713/176 |
| 2011/0126002 A1 * | 5/2011 | Fu ........................ | H04L 63/0823 713/159 |
| 2012/0266209 A1 * | 10/2012 | Gooding ................. | H04L 63/20 726/1 |

(Continued)

*Primary Examiner* — Kidest Bahta
(74) *Attorney, Agent, or Firm* — Myers Bigel, P.A.

(57) ABSTRACT

Methods of securely controlling a utility grid edge device are provided. A method of securely controlling a utility grid edge device includes receiving renewed security information at a node that includes cryptographic circuitry. Moreover, the method includes controlling an operation of the utility grid edge device via the node, after receiving the renewed security information. Related nodes and utility grid edge devices are also provided.

15 Claims, 12 Drawing Sheets

(56) References Cited

U.S. PATENT DOCUMENTS

| | | | |
|---|---|---|---|
| 2015/0088325 A1* | 3/2015 | Forbes, Jr. | G05B 19/02 |
| | | | 700/286 |
| 2015/0097694 A1* | 4/2015 | Laval | H04L 69/03 |
| | | | 340/870.02 |
| 2015/0378382 A1* | 12/2015 | Phatak | G06F 21/34 |
| | | | 700/295 |
| 2017/0229868 A1* | 8/2017 | Laval | H02J 3/0073 |
| 2020/0322353 A1* | 10/2020 | Bhandari | H04L 63/1425 |

* cited by examiner

METHODS OF SECURELY CONTROLLING UTILITY GRID EDGE DEVICES

CROSS-REFERENCE TO RELATED APPLICATION

The present application claims priority to U.S. Provisional Patent Application No. 63/174,704, filed on Apr. 14, 2021, the entire content of which is incorporated herein by reference.

FIELD

The present disclosure generally relates to utility grid edge devices and, more particularly, to security of utility grid edge devices and to related communications methods.

BACKGROUND

A microgrid is an energy system that may include distributed energy resources and loads that are capable of operating in concert with, or independently of, a main power grid. Field-deployed computer resources of an electric grid, however, including computer resources of a microgrid, may suffer severe cybersecurity deficiencies.

SUMMARY

A method of controlling a utility grid edge device may include receiving renewed security information at a node that includes cryptographic circuitry. Moreover, the method may include controlling an operation of the utility grid edge device via the node, after receiving the renewed security information. Related nodes and utility grid edge devices may also be provided.

DETAILED DESCRIPTION

Pursuant to embodiments of the present invention, methods of securely controlling a utility grid edge device are provided. By contrast, conventional operations of field-deployed computer resources of a utility grid may suffer severe cybersecurity deficiencies, including a lack of cryptographic identity and limited application-patching capabilities.

Example embodiments of the present invention will be described in greater detail with reference to the attached figures.

Figure 1A:
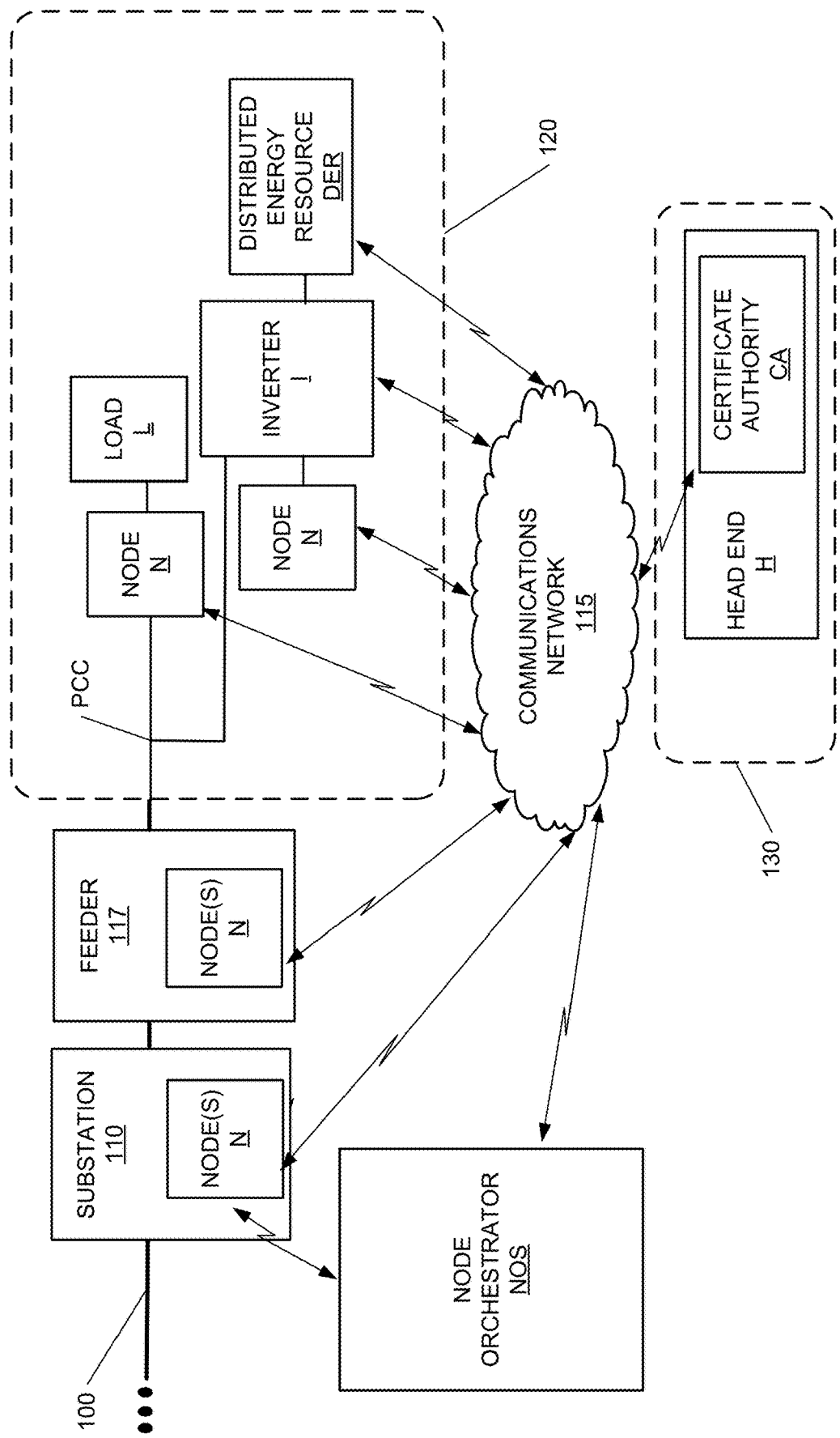
FIG. 1A is a schematic illustration of a grid and a microgrid, according to embodiments of the present invention.

FIG. 1A is a schematic illustration of a grid 100 and a microgrid 120, according to various embodiments. The grid 100 may be a utility grid such as an electric grid. A substation 110 of the grid 100 may be an electric utility substation that includes one or more transformers. Though one substation 110 is illustrated in FIG. 1A, the grid 100 may, in some embodiments, include more than one (e.g., two, three, four, five, dozens, hundreds, or more) substation 110.

A feeder 117 may be connected between output terminals of the substation 110 and input terminals of the microgrid 120. The feeder 117 may be referred to as a "distribution feeder" or a "distribution feeder circuit." A plurality of distribution feeder circuits may be connected to the substation 110 and may extend in different directions to serve various customers. The feeder 117 and the microgrid 120 may be referred to as being "downstream" from the substation 110.

The substation 110 and the microgrid 120 may communicate with a communications network 115, and may be electrically tied to each other via a Point of Common Coupling (PCC). The communications network 115 may include one or more wireless or wired communications networks, such as a local area network (e.g., Ethernet or Wi-Fi) or a Wide Area Network (e.g., a cellular network, Ethernet, or a fiber (such as fiber-optic) network).

In some embodiments, the microgrid 120 may include apparatuses, such as nodes N, that transmit and receive data via the communications network 115. For example, the nodes N of the microgrid 120 may communicate with each other via the communications network 115. Additionally or alternatively, the nodes N of the microgrid 120 may communicate via the communications network 115 with nodes that are external to the microgrid 120. As an example, the nodes N of the microgrid 120 may communicate via the communications network 115 with a node orchestrator NOS that is in the field of the grid 100. The node orchestrator NOS may, in some embodiments, be at or adjacent the substation 110. Alternatively, the node orchestrator NOS may be at a centralized location such as a distribution control center of an electric utility or a head end H of an electric utility data center 130.

In some embodiments, one or more nodes N may be at the substation 110. For example, the nodes N may be used to securely control dozens, or even hundreds or more, of utility grid edge devices that are at the substation 110.

Moreover, the nodes N of the microgrid 120 may optionally communicate via the communications network 115 with a centralized location such as the distribution control center or the head end H. The head end H can be a server or other computer that includes a certificate authority CA, which can provide trust bundles (e.g., digital certificates/keys) to the node orchestrator NOS. The nodes N (e.g., workloads 176 (FIG. 1C) of one or more nodes N) typically communicate with each other independently of the head end H, which may receive measurement data from various meters 111 (FIG. 1F) of an electric utility. For example, the node orchestrator NOS can provide trust bundles to agents 177 (FIG. 1C) of the nodes N, and the agents 177 can then provide trust bundles to workloads 176 of the nodes N. Each provision/communication of a trust bundle may be performed independently of the head end H.

For simplicity of illustration, only a few nodes N are illustrated in FIG. 1A. It will be understood, however, that various edge devices of the grid 100 and/or the microgrid 120 may be adjacent, and communicatively coupled to, respective nodes N. The nodes N may also be communicatively coupled to each other. For example, the nodes N may have peer-to-peer (and/or peer-to-multiple peers) communications with each other and/or with their respective edge devices. Accordingly, rather than relying on centralized control/communications via the head end H, the nodes N may communicate directly with each other and/or with their respective edge devices.

As an example, peer communications may be provided via a wire that directly connects a node N to its edge device (or via direct, wired connections to multiple edge devices). In some embodiments, this wired connection for peer communications may be a fiber or Ethernet connection. Additionally or alternatively, a node N and its edge device may communicate with each other wirelessly, such as via the communications network 115.

Each distributed energy resource DER of the microgrid 120 may be connected to a respective inverter I. A distributed energy resource DER may be any type of generator. For example, a distributed energy resource DER may be a solar (i.e., photovoltaic (PV)) generation system, a wind power generation system, or a diesel generator. Other examples of a distributed energy resource DER include a battery, a flywheel, a controllable load, a capacitor, and any other energy storage system. In some embodiments, multiple devices may be behind a single inverter I. As an example, a single inverter I may be the inverter for both a battery and a solar generation system. Each inverter I may be configured to convert a variable Direct Current (DC) output of one or more distributed energy resources DER into a utility frequency Alternating Current (AC) that can be fed into a commercial electrical grid (e.g., the grid 100) or be used by a local, off-grid electrical network.

Though an inverter I is illustrated in FIG. 1A, it will be understood that inverters are merely one example among various types of power converters that may be coupled to the distributed energy resources DER. For example, each distributed energy resource DER may be coupled to a respective power converter that may be configured to convert (i) from DC to DC (e.g., for a DC microgrid) and/or (ii) from DC to AC.

Each inverter I may be adjacent, and communicatively coupled to, a respective node N. Additionally or alternatively, the node N may be adjacent, and communicatively coupled to, the distributed energy resource(s) DER that the inverter I is connected to. As used herein with respect to a node N, the term "adjacent" refers to a distance of no more than one hundred meters from the node N. As an example, the distance may be no more than thirty feet or no more than thirty meters.

Figure 1B:
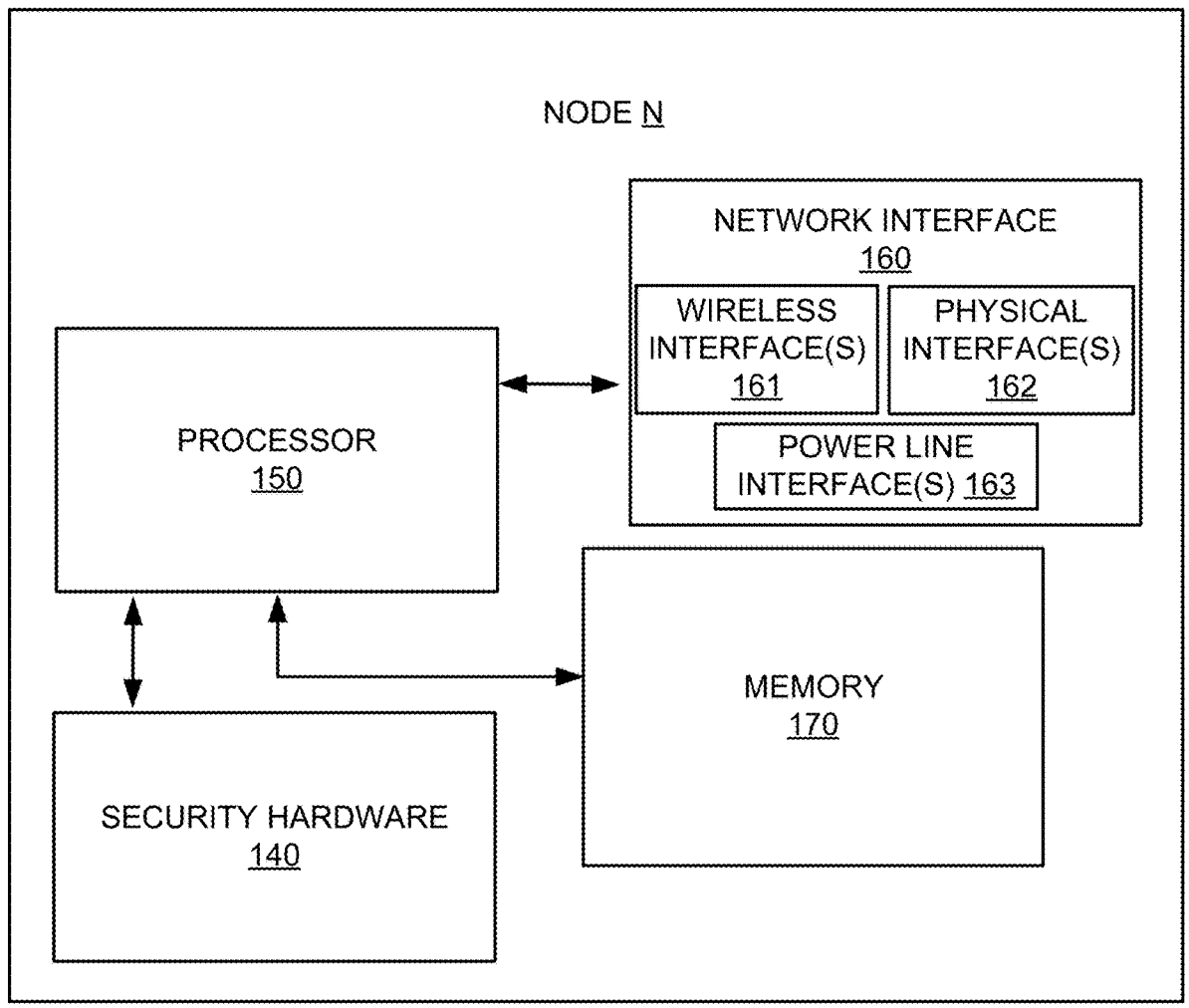
FIG. 1B is a block diagram of a node that is configured to control an operation of a utility grid edge device, according to embodiments of the present invention.
Figure 1C:
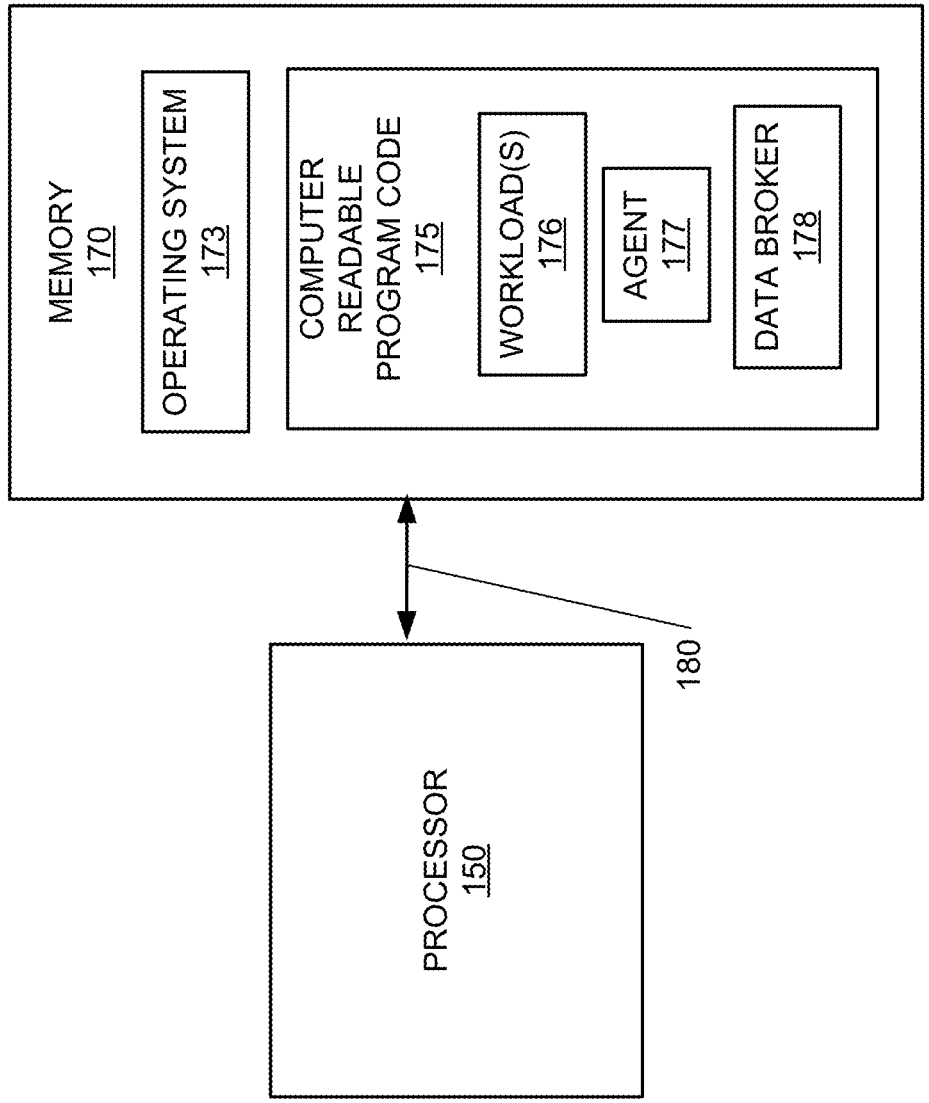
FIG. 1C is a block diagram that illustrates details of an example processor and memory that may be used in accordance with various embodiments.
Figure 1D:
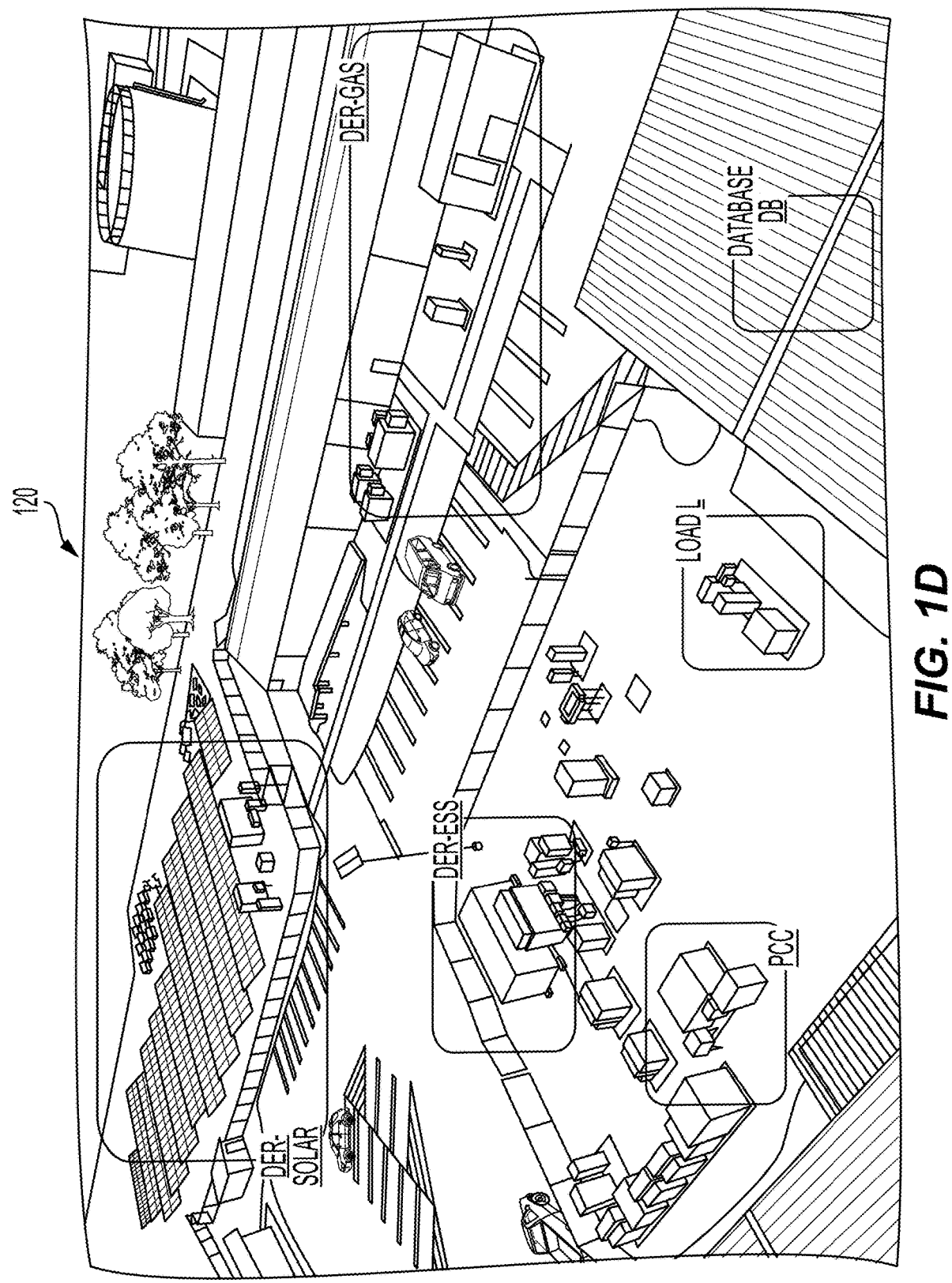
FIG. 1D is a schematic illustration of details of the microgrid of FIG. 1A.
Figure 1E:
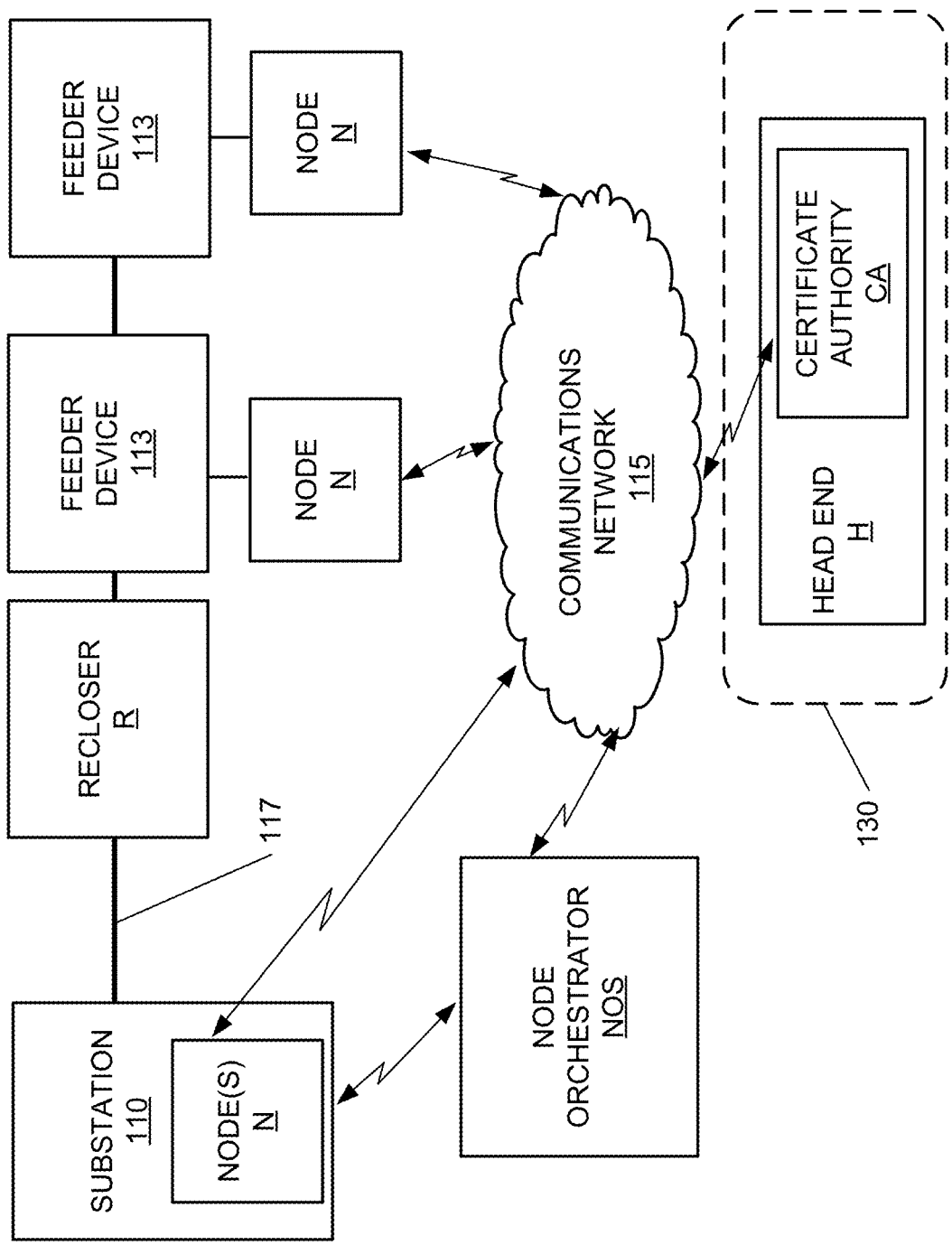
FIG. 1E is a schematic illustration of details of the feeder of FIG. 1A.
Figure 1F:
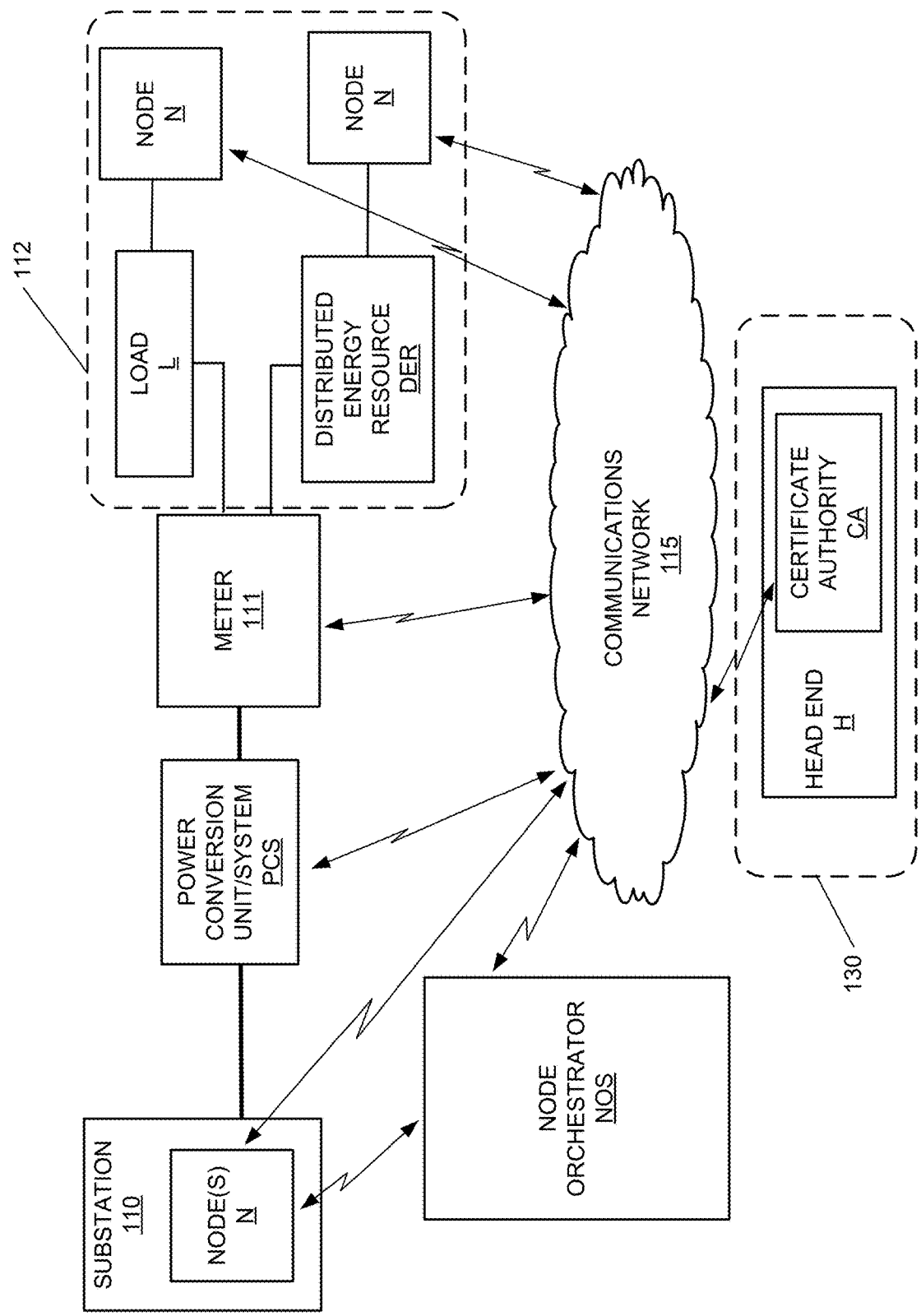
FIG. 1F is a schematic illustration of an electric utility meter that is at or adjacent a premise of a customer of an electric utility, according to embodiments of the present invention.

Moreover, as used herein, the term "utility grid edge device" may refer to any device at a substation 110, a feeder 117, a microgrid 120, or a customer premise 112 (FIG. 1F).

Examples of a utility grid edge device thus include a distributed energy resource DER, a load L, an inverter I, and various types of feeder devices 113 (FIG. 1E) and power transformation/distribution devices.

FIG. 1B is a block diagram of a node N that is configured to control an operation of a utility grid edge device, according to embodiments of the present invention. The node N may include security hardware 140, a processor 150, a network interface 160, and a memory 170. The processor 150 may be coupled to the security hardware 140 and the network interface 160. The processor 150 may be configured to communicate via the network interface 160 with other nodes N, a node orchestrator NOS (FIG. 1A), a utility grid edge device, and/or devices at a distribution control center, a substation 110 (FIG. 1A), and/or the electric utility data center 130 (FIG. 1A). The network interface 160 may be referred to herein as a "comms. interface" or a "communications interface."

For example, the network interface 160 may include one or more wireless interfaces 161 (e.g., 3G/4G/5G/LTE, other cellular, Wi-Fi, BLUETOOTH®, Global Positioning System (GPS) interfaces, etc.) and one or more physical interfaces 162 (e.g., Ethernet, serial, Universal Serial Bus (USB) interfaces, etc.). Moreover, the network interface 160 may optionally include one or more power line interfaces 163 (e.g., Low Voltage (LV) or Mid Voltage (MV) PLC).

Accordingly, the node N may, in some embodiments, have multiple integrated communications options. For example, the node N may provide PLC or cellular (or other long-range) communications via the network interface 160 to the substation 110, and may provide wired Ethernet (or other short-range) communications via the network interface 160 to a utility grid edge device.

The security hardware 140 may include cryptographic circuitry, such as a microprocessor that is dedicated to carrying out cryptographic operations. For example, the cryptographic circuitry may comprise a Trusted Platform Module (TPM) chip/cryptoprocessor. The cryptographic circuitry may be used to attest the identity of the node N (e.g., identity information regarding hardware/circuitry thereon).

Referring still to FIG. 1B, the memory 170 may be coupled to the processor 150. The memory 170 may also store instructions/algorithms used by the processor 150. Moreover, a node orchestrator NOS can communicate with a plurality of nodes N and may include any of the circuitry/functionality of the node N. Likewise, a utility grid edge device may, in some embodiments, include any of the circuitry/functionality of the node N. As a result, the edge device may operate like a workload 176 (FIG. 1C) of a node N, such as by communicating with an agent 177 (FIG. 1C), receiving a trust bundle, and using a field message bus communications protocol. Moreover, the node orchestrator NOS may include a Hardware Security Module (HSM), which may comprise a TPM and/or other security hardware 140, and may be at a hierarchical level above that of nodes N and edge devices.

FIG. 1C is a block diagram that illustrates details of an example processor 150 and memory 170 that may be used in accordance with various embodiments. The processor 150 communicates with the memory 170 via an address/data bus 180. The processor 150 may be, for example, a commercially available or custom microprocessor. Moreover, the processor 150 may include multiple processors. The memory 170 may be a non-transitory computer readable storage medium and may be representative of the overall hierarchy of memory devices containing the software and data used to implement various functions of a node N as described herein. The memory 170 may include, but is not limited to, the following types of devices: cache, ROM, PROM, EPROM, EEPROM, flash, Static RAM (SRAM), and Dynamic RAM (DRAM).

As shown in FIG. 1C, the memory 170 may hold various categories of software and data, such as computer readable program code 175 and/or an operating system 173. The computer readable program code 175 may include various applications/containers, including, for example, one or more workloads 176, an agent 177, and a data broker 178. The operating system 173 controls operations of the node N. In particular, the operating system 173 may manage the resources of the node N and may coordinate execution of various programs by the processor 150. For example, the computer readable program code 175, when executed by a processor 150 of the node N, may cause the processor 150 to perform any of the operations illustrated in the flowcharts of FIGS. 2A to 2F. In some embodiments, the workloads 176 may run on the operating system 173.

FIG. 1D is a schematic illustration of details of a microgrid 120 (FIG. 1A). Specifically, FIG. 1D illustrates examples of components that the microgrid 120 may include. As shown in FIG. 1D, examples of distributed energy resources DER (FIG. 1A) include a solar PV system DER-SOLAR, an energy storage system DER-ESS, and a gas-based (e.g., natural gas) system DER-GAS. Further examples of distributed energy resources DER include a fuel cell and a wind turbine. In some embodiments, each distributed energy resource DER may be configured to produce (or store, in the case of the energy storage system DER-ESS) less than 10 megawatts (MW) of power. It will be understood, however, that some distributed energy resources DER may be configured to produce more than 10 MW. For example, a PV farm may produce 100 MW.

FIG. 1D also illustrates that the microgrid 120 may include a database DB, which may be provided by one or more server computers inside a building (or in a field-based enclosure). In some embodiments, the database DB may receive data from nodes N (FIG. 1A) that are distributed throughout the microgrid 120. For example, the database DB may be communicatively coupled to the nodes N via a wireless communications network, such as a cellular or Wi-Fi network. Moreover, the microgrid 120 may, in some embodiments, include a certificate authority CA (FIG. 1A) and/or a node orchestrator NOS (FIG. 1A), either of which may comprise the database DB.

Though omitted from view in FIG. 1D for simplicity of illustration, a respective node N may be adjacent, and communicatively coupled to, each distributed energy resource DER that is shown in FIG. 1D. Moreover, in some embodiments, respective nodes N may be adjacent, and communicatively coupled to, the load L and the PCC.

FIG. 1E is a schematic illustration of details of the feeder 117 (FIG. 1A). As shown in FIG. 1E, the feeder 117 may comprise a plurality of utility grid edge devices 113 that are adjacent, and communicatively coupled to, respective nodes N. Examples of the devices 113 include a recloser R and a relay. At least one of the devices 113 may also be adjacent a recloser R of the feeder 117. Moreover, a node N may be inside a housing of the recloser R. In some embodiments, a first of the nodes N may use renewed security information that it receives to provide encrypted communications (e.g., via the communications network 115) with a second of the nodes N.

Renewed security information may be a trust bundle that includes, for example, a renewed digital certificate and/or a renewed digital security key. In some embodiments, a private digital security key and a public digital security key may both be included in the renewed certificate.

FIG. 1F is a schematic illustration of an electric utility meter 111 that is at or adjacent a premise 112 of a customer of an electric utility. For example, the customer premise 112 may be a house, apartment, office, or other building, location, or structure, for which the meter 111 can be provided for the customer. A customer premise 112 may thus be a structure such as a billboard, as well as a home or a business. Accordingly, the term "premise," as used herein, may be interchangeable with the term "premises," in that either term may be used herein to refer to a building, part of a building, or other structure for which the meter 111 may be provided.

One or more nodes N may be adjacent, and communicatively coupled to, respective utility grid edge devices that are at the customer premise 112. For example, the customer premise 112 may be a hospital and an edge device at the hospital may be a health (e.g., patient treatment/diagnostic) machine.

The meter 111 may be configured to interface with one or more distributed energy resources DER at the customer premise 112. For example, the meter 111 may be configured to interface with a solar PV system, a fuel cell, an energy storage system, or an Electric Vehicle (EV) charging station.

The meter 111 may provide electricity from an electric grid 100 (FIG. 1A) to at least one load L that is at the customer premise 112, and may measure electricity usage at the customer premise 112. The load L may be an AC load or a DC load (e.g., the customer premise 112 may be entirely DC). For example, the load(s) L may include at least one appliance that may be powered by the electric grid 100 through the meter 111. An appliance may be a refrigerator, dishwasher, laundry machine, oven, or any other large machine that uses electricity to perform, for example, cooking, cleaning, or food preservation functions in a household, institutional, commercial, or industrial setting.

Additionally or alternatively to appliances, the load(s) L may include various devices that use electricity and are connected to the meter 111. For example, consumer electronics and heating/cooling devices and/or systems may be at the customer premise 112. Moreover, in some embodiments, the customer premise 112 may be a billboard, and the electric grid 100 may provide power for lights or an electronic display of the billboard.

Each load L and each distributed energy resource DER may be adjacent, and communicatively coupled to, a respective node N. Accordingly, each load L and each distributed energy resource DER may be securely controlled via its respective node N.

The meter 111 is downstream from an electric utility substation 110 that serves the customer premise 112. The substation 110 may include one or more transformers. Between the substation 110 and the meter 111 is a power conversion unit/system PCS (or an inverter or a boost or buck DC-to-DC converter), which may control a voltage level of power that is transmitted to the meter 111. In particular, the conversion unit/system PCS serves the customer premise 112 and may be the closest converter/transformer of the electric grid 100 to the customer premise 112. The conversion unit/system PCS may be underground, mounted on a concrete pad, mounted on a utility pole, or otherwise fixed at a location that is upstream and spaced apart from the meter 111. In some embodiments, the meter 111 may include any of the circuitry/functionality of a node N.

A single conversion unit/system PCS may provide power to one or more customers in a given area. For example, in an urban area, a plurality of homes may be fed off of a single conversion unit/system PCS. Rural distribution, on the other hand, may use one conversion unit/system PCS per customer. Moreover, a large commercial or industrial complex may rely on multiple conversion units/systems PCS.

A conversion unit/system PCS has a low-voltage secondary (e.g., output) side that distributes power to one or more customers. For example, in the United States, the low-voltage secondary side of the conversion unit/system PCS may be configured for a 240/120-Volt system, and three wires (including one neutral wire) may be fed from the low-voltage secondary side to the meter 111.

The meter 111 (or the conversion unit/system PCS) may be communicatively coupled to an office/data center 130 of an electric utility via a communications network 115. For example, the communications network 115 may comprise a wireless network, such as a cellular (e.g., 3G/4G/5G/LTE, other cellular) network and/or a wireless mesh network. Accordingly, the meter 111 (or the conversion unit/system PCS) may communicate wirelessly with the office/data center 130, which may comprise a head end H of the electric utility, via the communications network 115. As an example, the meter 111 may transmit its measurements of electricity usage at the customer premise 112 to the head end H.

Figure 2A:
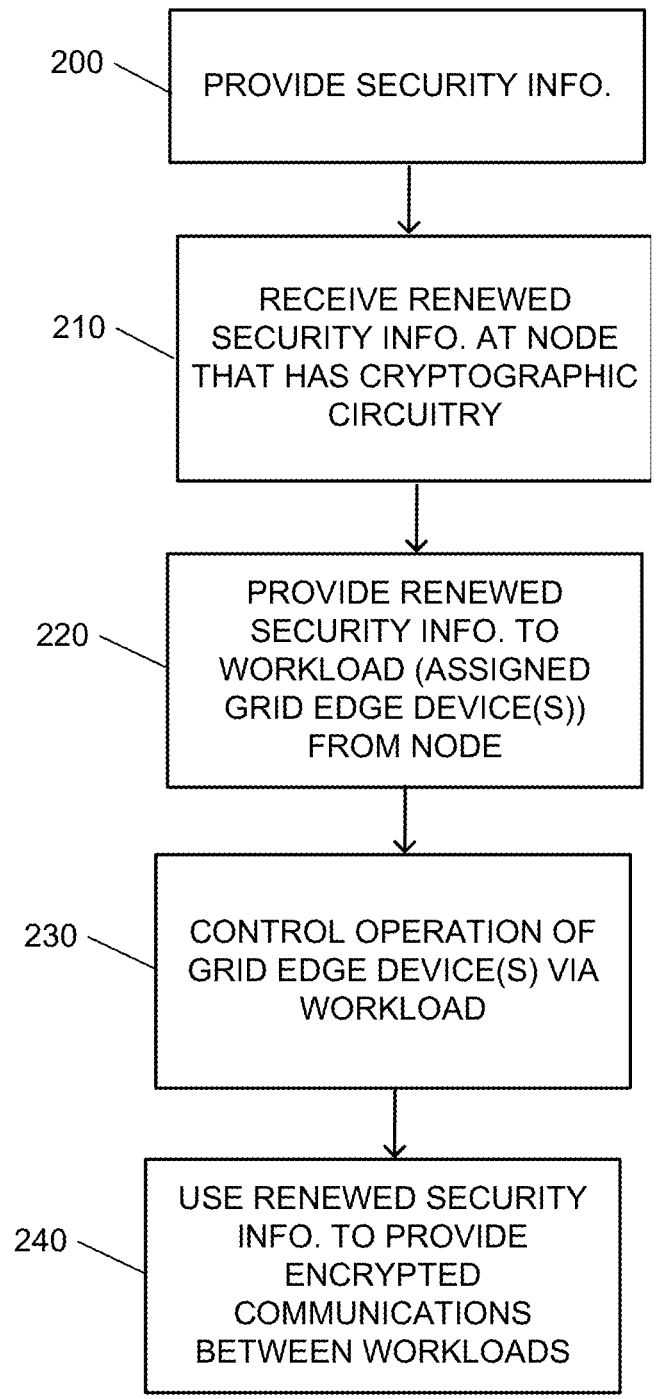
FIG. 2A is a flowchart of operations for securely controlling a utility grid edge device, according to embodiments of the present invention.

FIG. 2A is a flowchart of operations for securely controlling a utility grid edge device. As shown in FIG. 2A, the operations may include receiving (Block 210) renewed security information (e.g., a renewed digital certificate/security key) at a node N (FIG. 1B) that includes security hardware 140 (FIG. 1B), such as cryptographic circuitry. As a result, an operation of the edge device may be controlled (Block 230) via the node N. For example, control of the operation may be performed via a direct, wired (e.g., Ethernet) communications link that is between the node N and the edge device. As another example, control of the operation may be performed via a wireless communications link that is between the node N and the edge device.

In some embodiments, the operation may comprise opening or closing the edge device, or reading, setting, or resetting a status of the edge device. As an example, the operation may comprise solar smoothing that is managed by a volt/VAR application that is on the node N. Moreover, the edge device may comprise, for example, a switch, a recloser, a capacitor bank, a voltage regulator, a meter, an inverter, a Power Conversion System (PCS), an EV charger, a Battery Management System (BMS), a battery, an ultra capacitor, a diesel generator set, or a gas generator.

Control (Block 230) of the operation of the edge device may be provided by, for example, a workload 176 (FIG. 1C) that is on the node N. The workload 176 may be provided (e.g., downloaded/installed) on the node N either before or while the node N is adjacent the edge device. In some embodiments, operations for securely controlling the edge device may include using (Block 240) the renewed security information to provide encrypted communications between the workload 176 and (a) another workload 176 that is on the node N or (b) another workload 176 that is on another node N. As an example, the node N may comprise a data broker 178 (FIG. 1C) thereon, and the encrypted communications may be provided via the data broker 178. The data broker 178 may use/interface with a publish/subscription ("pub/sub") interface of a field message bus to provide the encrypted communications. Moreover, the encrypted communications may, in some embodiments, be provided between two nodes N that are each at the same microgrid 120 (FIG. 1A), feeder 117 (FIG. 1E), or substation 110 (FIG. 1A).

Each workload 176 and/or each data broker 178 may, in some embodiments, comprise computer readable program code 175 (FIG. 1C) that is stored in a memory 170 (FIG. 1C) of the node N. An agent 177 that communicates with a workload 176 may likewise comprise computer readable program code 175. Moreover, each workload 176 may be assigned to at least one edge device before the node N receives the renewed security information. For example, the node N may be adjacent first and second edge devices that have been assigned to a particular workload 176 on the node N. Accordingly, the workload 176 may control respective operations of the first and second edge devices. Alternatively, the node N may have first and second workloads 176 thereon that control respective operations of the first and second edge devices.

Referring still to FIG. 2A, operations for securely controlling the edge device may include providing (Block 200) security information at the node N. For example, the security information may be provided to a workload 176 of the node N. To enhance security, however, the security information may automatically expire in no more than one hour (or another frequency, such as no more than one second, minute, or day). The renewed security information that the node N receives (Block 210) thus may be a renewed (e.g., replacement) version of the security information provided by the operation(s) of Block 200. The renewed security information, like the security information, may automatically expire in no more than one hour.

In some embodiments, the renewed security information may be provided (Block 220) to a workload 176 of the node N. As an example, the node N may comprise an agent 177 (FIG. 1C) and a workload 176, and operations of receiving (Block 210) and providing (Block 220) the renewed security information via the node N may include (i) receiving the renewed security information at the agent 177 and (ii) providing the renewed security information from the agent 177 to the workload 176.

Figure 2B:
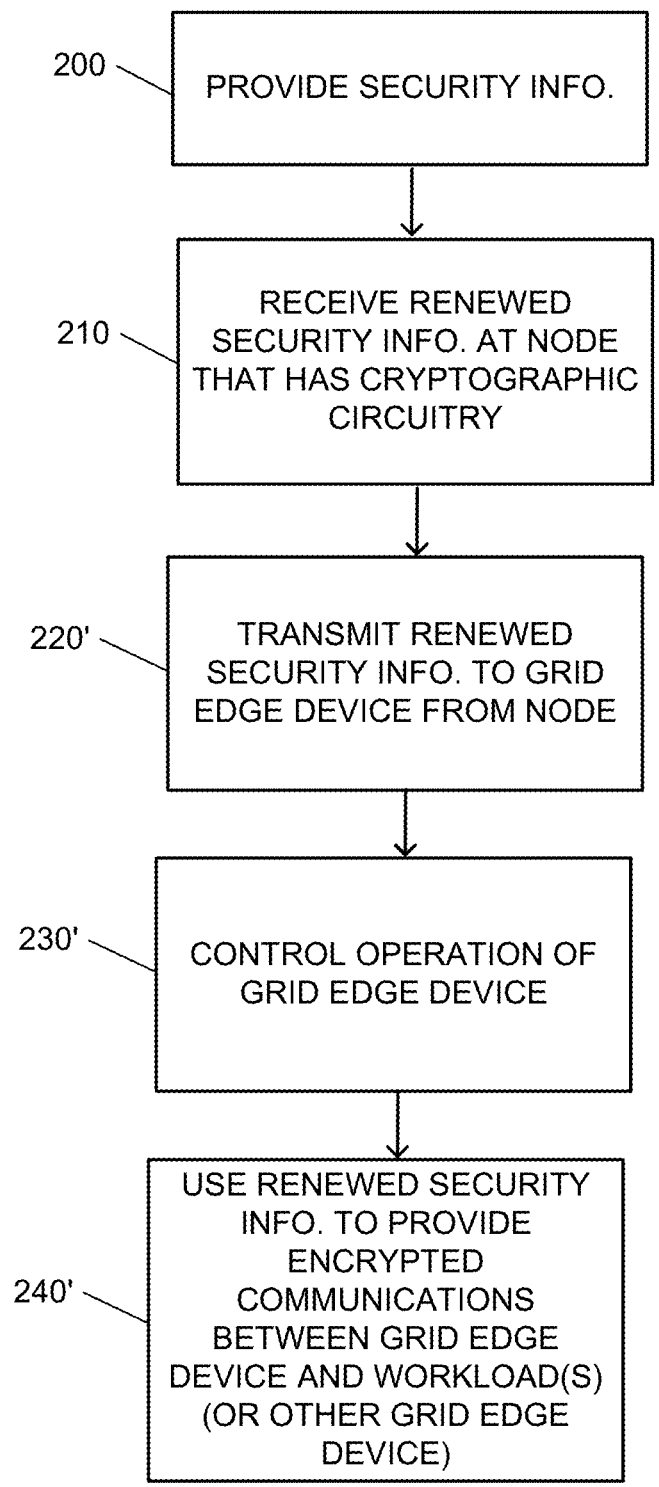
FIG. 2B is a flowchart of operations for securely controlling a utility grid edge device, according to other embodiments of the present invention.

FIG. 2B is a flowchart of operations for securely controlling a utility grid edge device, according to other embodiments of the present invention. Specifically, FIG. 2B is an alternative to FIG. 2A in which the edge device receives renewed security information. The edge device may thus include any of the circuitry that is shown in FIG. 1B for a node N. Rather than providing renewed security information from a node N to a workload 176 (FIG. 1C) of that node N, operations of FIG. 2B include transmitting (Block 220') renewed security information to the edge device from the node N. Likewise, instead of controlling an operation of the edge device via the workload 176, the edge device can independently control (Block 230') itself upon receiving the renewed security information. Moreover, rather than using renewed security information to provide encrypted communications between workloads 176, the edge device can use (Block 240') the renewed security information to provide encrypted communications between itself and (a) one or more workloads 176 or (b) another edge device.

Figure 2C:
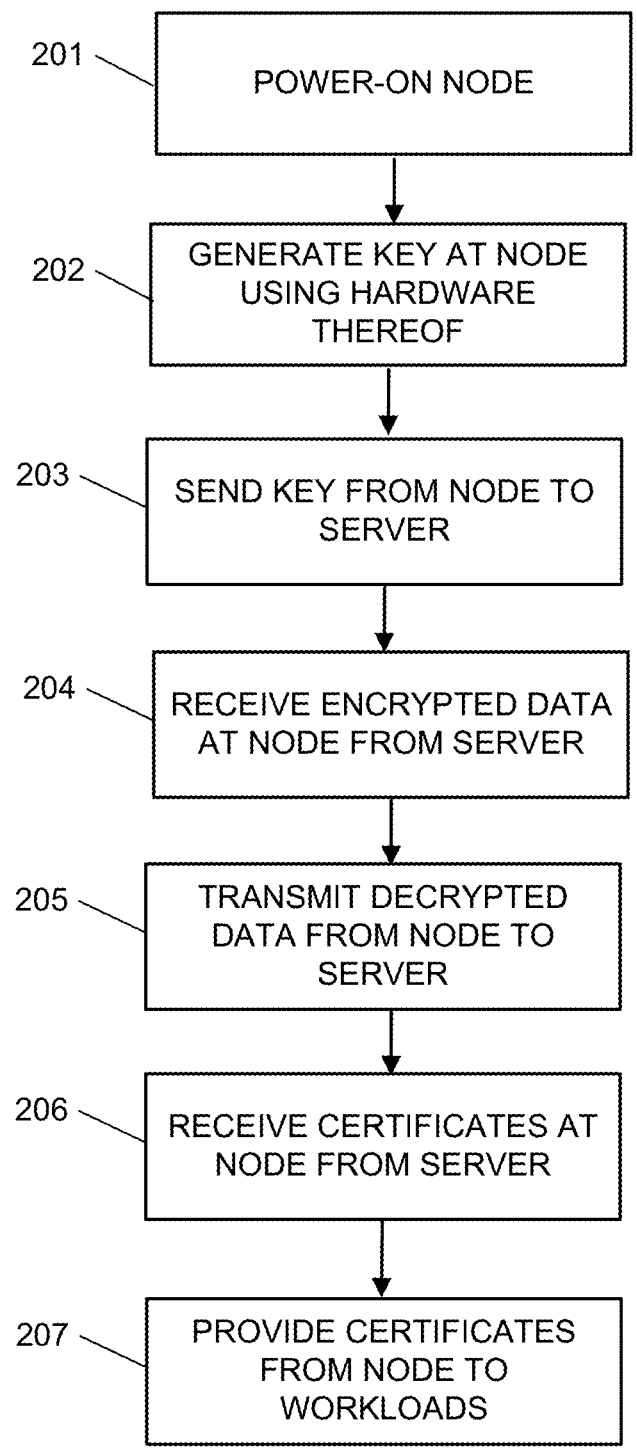
FIG. 2C illustrates details of operations of providing security information.

FIG. 2C provides details of operations of providing (Block 200 of FIGS. 2A and 2B) security information. Specifically, FIG. 2C shows that operations of providing security information may include powering-on (Block 201) a node N, accessing (Block 202) a digital security key at the node N by using security hardware 140 (FIG. 1B) thereof, and sending (Block 203) the key from the node N to a server. For example, the server may comprise a node orchestrator NOS (FIG. 1A) that receives the key from the node N and responsively generates encrypted data.

The security hardware 140 may comprise a TPM that ships with an endorsement key (EK) private/public key pair. The EK private key, which never changes and must be protected, may never be seen/visible. The TPM can generate a hash, however, of the EK public key. The TPM can generate an attestation key (AK) for other signing purposes.

The node N may then receive (Block 204) the encrypted data from the server and may responsively decrypt the data and transmit (Block 205) the decrypted data to the server. The node orchestrator NOS may respond to the decrypted data by providing one or more digital certificates that the node N receives (Block 206) from the server. In some embodiments, communications between the node N and the server may all be performed via a communications network 115 (FIG. 1A). Moreover, the node N may provide (Block 207) each certificate to a respective workload 176 that is on the node N.

Figure 2D:
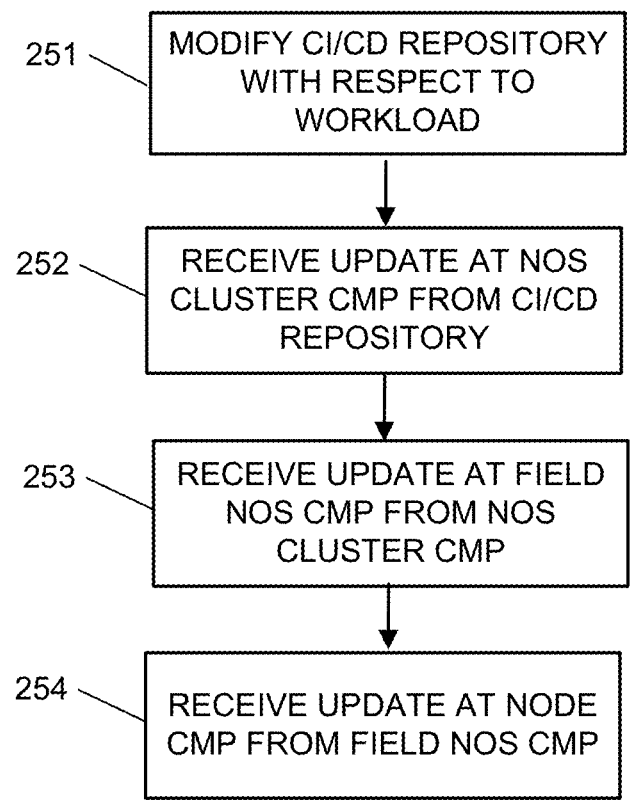
FIG. 2D illustrates operations with respect to a new (or modified) workload.

FIG. 2D illustrates operations with respect to a new (or modified) workload 176. These operations may be used to deploy, operate, and/or update workloads 176, and thus may occur after the operations that are shown in FIG. 2C, which may be used to provision and/or deploy a node N on which the workloads 176 can be stored and operated. The operations shown in FIG. 2D may include an operation of modifying (Block 251) a Continuous Integration/Continuous Deployment (CI/CD) repository with respect to one or more workloads 176. If no workloads 176 are present on the node N, then this operation may include delivering one or more workloads 176 to the node N (e.g., by a workload manager). A NOS cluster workload manager can then receive (Block 252) an update from the CI/CD repository regarding the modification. The NOS cluster workload manager can, in turn, provide an update (Block 253) that is received by a field NOS workload manager, which then updates (Block 254) a node N workload manager. Workload manager operations described herein may, in some embodiments, be performed by one or more agents 177 (FIG. 1C). Moreover, though Blocks 252-254 of FIG. 2D illustrate operations with respect to a container management platform (CMP), it will be understood that a CMP is merely an example of a workload manager.

In some embodiments, operations shown in FIG. 2D may be performed as part of controlling (Block 230 of FIG. 2A) an operation of an edge device via a node N. For example, controlling (Block 230) the operation may include modifying (Block 251) a CI/CD repository based on removing a first workload 176 from a node N and/or adding a second workload 176 to the node N.

Figure 2E:
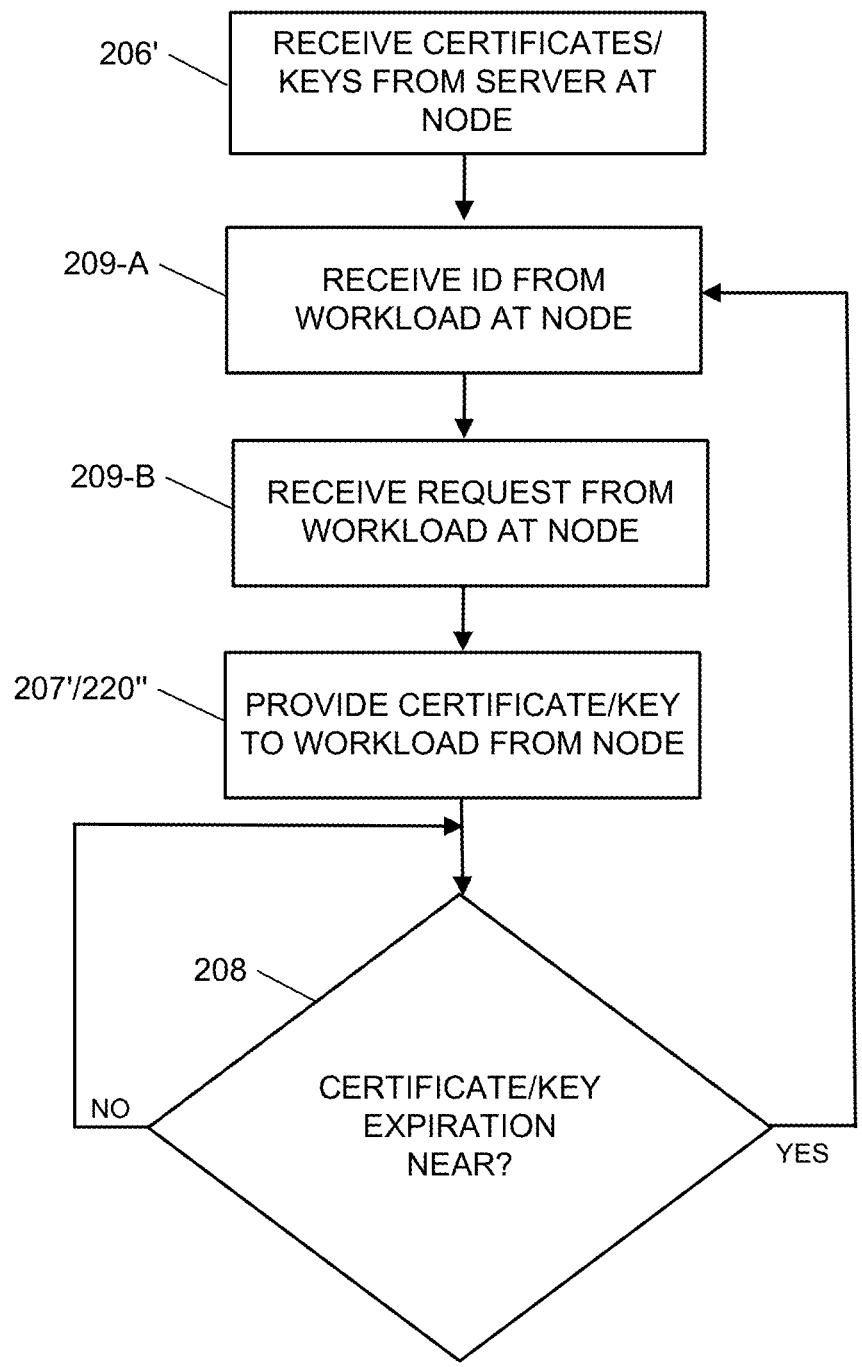
FIG. 2E illustrates details related to operations of FIGS. 2A and 2C.

FIG. 2E illustrates details related to operations of FIGS. 2A and 2C. For example, referring to FIG. 2C, operations of receiving certificates at a node N may additionally or alternatively include receiving (Block 206') digital security keys at the node N from a server (e.g., from a node orchestrator NOS (FIG. 1A)). Likewise, operations of providing certificates from the node N to workloads 176 may additionally or alternatively include providing (Block 207') respective digital security keys from the node N to the workloads 176. Responsive to the expiration (Block 208) of a certificate/key nearing, a workload 176 using that certificate/key may provide (Block 209-A) information about the identity ("ID") of the workload 176 to the node N. The node N may also (either separately or simultaneously) receive (Block 209-B) a request from the workload 176 for a renewed certificate/key.

Figure 2F:
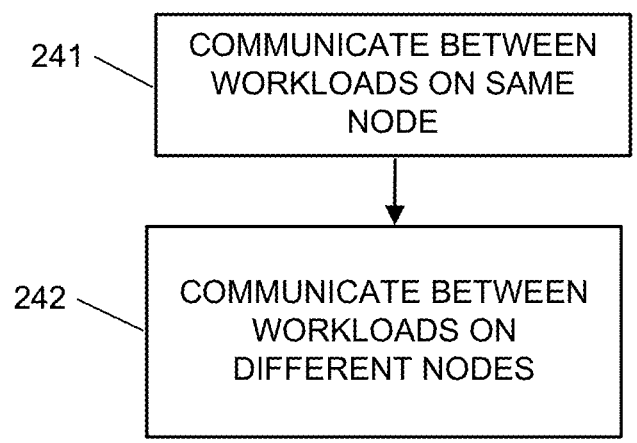
FIG. 2F illustrates details of operations of using renewed security information to provide encrypted communications.

FIG. 2F illustrates details of operations of using renewed security information to provide (Block 240 of FIG. 2A) encrypted communications. The operations may include communicating (Block 241) between workloads 176 that are on the same node N. Moreover, the operations may include communicating (Block 242) between workloads 176 that are on different respective nodes N. The communications illustrated in FIG. 2F may each be performed using a pub/sub interface of a field message bus.

According to some embodiments, secure control of a utility grid edge device may involve both (i) operations in a control plane and (ii) operations in a data plane. The control plane may move applications (e.g., workloads 176 (FIG. 1C)) among various nodes N and/or edge devices. The control plane may also renew digital certificates. In some embodiments, digital certificates may be irrevocable. Rather than revoking a certificate from a node N, an application (e.g., a workload 176) may be removed from the node N, such as by deleting the application from a memory 170 (FIG. 1B) of the node N. As an example, the application may be automatically deleted in response to expiration of the certificate. In some embodiments, each application that is moved/removed from a node N or an edge device may be a respective workload 176.

The data plane may use a field message bus and may be secured by operations in the control plane. Accordingly, the control plane enables the data plane to operate securely. Use of a field message bus pub/sub interface by the data plane may enable low-latency functions, eased integration, support for data sharing, and reduction/elimination of siloes. For example, the following patent applications, the entire disclosures of which are hereby incorporated by reference, discuss a field message bus: U.S. patent application Ser. No. 14/264,757, filed on Apr. 29, 2014, and published as U.S. Patent Application Publication No. 2015/0097694, entitled Methods of Processing Data Corresponding to a Device that Corresponds to a Gas, Water, or Electric Grid, and Related Devices and Computer Program Products, U.S. patent application Ser. No. 14/270,914, filed on May 6, 2014, now U.S. Pat. No. 9,722,665, entitled Communication Nodes and Sensor Devices Configured to Use Power Line Communication Signals, and Related Methods of Operation, and U.S. patent application Ser. No. 15/424,227, filed on Feb. 3, 2017, and published as U.S. Patent Application Publication No. 2017/0229868, entitled METHODS OF MICROGRID COMMUNICATIONS AND CONNECTION TRANSITIONS.

Methods of securely controlling utility grid edge devices according to embodiments of the present invention may provide a number of advantages. These advantages include controlling the edge devices from a zero-trust perspective that enhances security of the edge devices. For example, each deployment, and each patch/update, of an application (e.g., workload 176 (FIG. 1C)) used with respect to an edge device may occur in a zero-trust environment that requires a Public Key Infrastructure (PKI) with a layered chain of trust that is tied to a certificate authority CA (FIG. 1A) and anchored by a field device identity derived from a TPM. Moreover, frequent (e.g., hourly) renewal of trust bundles that enable communications (or other operations) with respect to edge devices may further enhance security.

The present invention has been described above with reference to the accompanying drawings. The present invention is not limited to the illustrated embodiments. Rather, these embodiments are intended to fully and completely disclose the present invention to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

It will also be understood that though the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of present invention.

Example embodiments of the present invention may be embodied as nodes, devices, apparatuses, and methods. Accordingly, example embodiments of present invention may be embodied in hardware and/or in software (including firmware, resident software, micro-code, etc.). Furthermore, example embodiments of present invention may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of present invention are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create/use circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the specification, various embodiments of the present invention have been disclosed and, though specific terms are employed, they are used in a generic and descriptive sense only and not for purposes of limitation. Those skilled in the art will readily appreciate that many modifications are possible for the disclosed embodiments without materially departing from the teachings and advantages of the present invention. The present invention is defined by the following claims, with equivalents of the claims to be included therein.

What is claimed is:

1. A method of securely controlling a utility grid edge device, the method comprising:
receiving renewed security information, from a distributed certification authority (CA) server on a first node in a cluster of nodes, at a second node within the cluster of nodes and that is adjacent the utility grid edge device and that includes cryptographic circuitry comprising a Trusted Platform Module (TPM), wherein the first node, the second node receiving the renewed security information, and the utility grid edge device are each outside of a data center, wherein the second node comprises a memory comprising an agent and a workload, wherein the workload comprises an application that controls an operation of the utility grid edge device, and wherein receiving the renewed security information at the second node comprises:
receiving the renewed security information at the agent from the distributed CA server on the first node,
providing the renewed security information from the agent to the workload, wherein the renewed security information comprises a private digital security key and a public digital security key and automatically expires in no more than one hour, and
patching or updating the workload using a Public Key Infrastructure (PKI); then controlling the operation of the utility grid edge device via the second node.

2. The method of claim 1, wherein the method further comprises using the renewed security information to provide identity-based encrypted communications between the workload and another workload that is on the second node or on another node within the cluster of nodes that is different from the first and second nodes.

3. The method of claim 2, wherein the encrypted communications are provided via a data broker that is on the second node or on the another node in the cluster of nodes.

4. The method of claim 1,
wherein the utility grid edge device comprises a first utility grid edge device, and
wherein the method further comprises controlling, via the second node, an operation of a second utility grid edge device that is adjacent the second node.

5. The method of claim 4, wherein adjacent the second node comprises no more than thirty meters from the second node.

6. The method of claim 4, wherein controlling the operation of the first utility grid edge device and controlling the operation of the second utility grid edge device are performed via first and second workloads, respectively, on the first and second nodes.

7. The method of claim 1, wherein controlling the operation of the utility grid edge device is performed via a direct, wired communications link that is between the second node and the utility grid edge device.

8. The method of claim 1, wherein controlling the operation of the utility grid edge device is performed via a wireless communications link that is between the second node and the utility grid edge device.

9. The method of claim 1,
wherein the method further comprises providing trust bundles from a certificate authority (CA) to a distributed CA node orchestrator that communicates with the second node and a third node within the cluster of nodes, and
wherein the trust bundles comprise digital certificates and/or digital keys and enable communications, or other operations, with respect to utility grid edge devices.

10. The method of claim 1, wherein the utility grid edge device is at a customer premise.

11. The method of claim 1, wherein the utility grid edge device is a first utility grid edge device of a feeder and is adjacent a recloser of the feeder.

12. The method of claim 11,
wherein the feeder further comprises a second utility grid edge device and a third node within the cluster of nodes and that is adjacent to the second utility grid edge device, and
wherein the method further comprises using the renewed security information to provide encrypted communications between the second node and the third node.

13. The method of claim 1,
wherein the utility grid edge device is a first utility grid edge device of a microgrid,
wherein the microgrid further comprises a second utility grid edge device that is adjacent a third node, and
wherein the method further comprises using the renewed security information to provide encrypted communications between the second node and the third node.

14. The method of claim 1, wherein controlling the operation of the utility grid edge device via the second node comprises:
removing a first workload from the second node and/or adding a second workload to the second node.

15. The method of claim 1, further comprising, before receiving the renewed security information:
powering-on the second node;
accessing a digital security key at the second node by using the cryptographic circuitry;
sending the digital security key from the second node to the distributed CA server on the first node;
receiving encrypted data at the second node from the distributed CA server on the first node;
decrypting the data at the second node;
transmitting the decrypted data from the second node to the distributed CA server on the first node; and
receiving a digital certificate at the second node from the distributed CA server on the first node, in response to transmitting the decrypted data from the second node to the distributed CA server on the first node.

* * * * *